| (12) | United States Patent | (10) Patent No.: US 11,828,591 B2 |
|---|---|---|
| | Mori et al. | (45) Date of Patent: Nov. 28, 2023 |

(54) ANGLE DETECTION APPARATUS

(71) Applicant: Mitsubishi Electric Corporation, Tokyo (JP)

(72) Inventors: Tatsuya Mori, Tokyo (JP); Toshihiro Matsunaga, Tokyo (JP); Hiroko Ikeda, Tokyo (JP); Seiji Sawada, Tokyo (JP); Kenta Kubo, Tokyo (JP); Kenji Ikeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 292 days.

(21) Appl. No.: 17/290,283

(22) PCT Filed: Jan. 25, 2019

(86) PCT No.: PCT/JP2019/002395
§ 371 (c)(1),
(2) Date: Apr. 30, 2021

(87) PCT Pub. No.: WO2020/152836
PCT Pub. Date: Jul. 30, 2020

(65) Prior Publication Data
US 2022/0018646 A1 Jan. 20, 2022

(51) Int. Cl.
*G01B 5/20* (2006.01)
*G01B 7/30* (2006.01)
*G01D 5/20* (2006.01)

(52) U.S. Cl.
CPC .............. *G01B 7/30* (2013.01); *G01D 5/204* (2013.01)

(58) Field of Classification Search
CPC ............ G01B 7/30; G01D 5/204; G01D 3/08; H03M 1/485; H03M 1/48; H03M 1/645; H02K 24/00
See application file for complete search history.

(56) References Cited

U.S. PATENT DOCUMENTS

2005/0212511 A1* 9/2005 Kujirai ................. G01D 5/2046
324/207.25

FOREIGN PATENT DOCUMENTS

| JP | 2000-018968 A | 1/2000 |
|---|---|---|
| JP | 2008-58180 A | 3/2008 |

(Continued)

OTHER PUBLICATIONS

Chinese Office Action dated Dec. 23, 2022 in Application No. 201980089736.1.

(Continued)

*Primary Examiner* — Son T Le
(74) *Attorney, Agent, or Firm* — Sughrue Mion, PLLC; Richard C. Turner

(57) ABSTRACT

Even using the redundant system resolver in which the magnetic interference between systems occurs, to provide an angle detection apparatus which can reduces the influence of the magnetic interference and can calculate the rotational angle with good accuracy, without performing synchronous control between systems in real time. An angle detection apparatus is provided with a resolver which has the first system windings and the second system windings in which magnetic interference occurs between systems; a first system removal processing unit that performs a second cycle component removal processing which removes component of the second cycle of the second system, to detection values of the first system winding output signals; and a first system angle calculation unit that calculates a first angle of rotor, based on the detection values of the first system winding output signals after the second cycle component removal processing.

10 Claims, 11 Drawing Sheets

(56) References Cited

FOREIGN PATENT DOCUMENTS

JP       2009-210281 A     9/2009
JP       2013-257284 A     12/2013

OTHER PUBLICATIONS

International Search Report for PCT/JP2019/002395 dated Feb. 26, 2019 (PCT/ISA/210).
Communication dated Nov. 9, 2021, issued by the Japanese Patent Office in application No. 2020-567324.

* cited by examiner

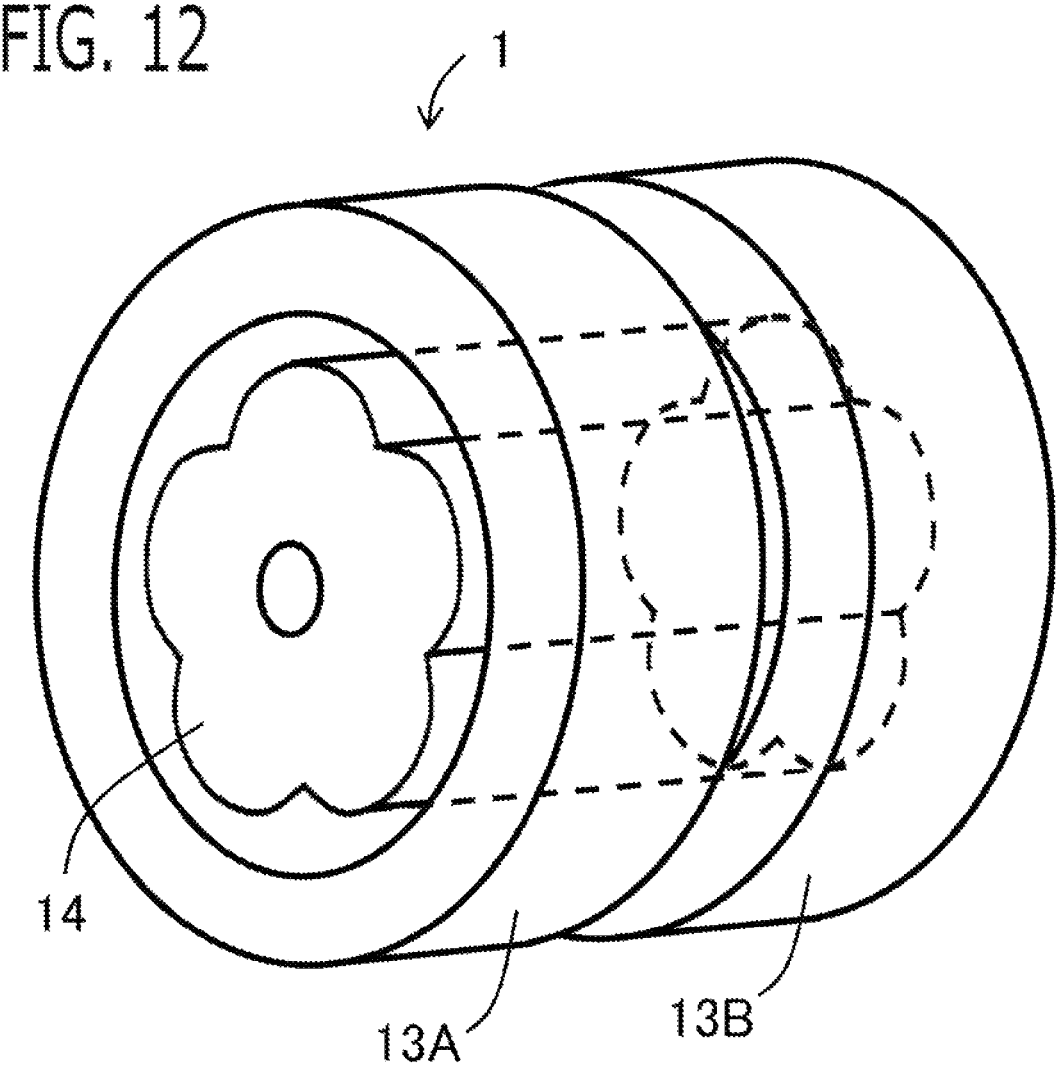

ANGLE DETECTION APPARATUS

CROSS REFERENCE TO RELATED APPLICATIONS

This application is a National Stage of International Application No. PCT/JP2019/002395 filed Jan. 25, 2019.

TECHNICAL FIELD

The present disclosure relates to an angle detection apparatus.

BACKGROUND ART

As the angle detection device which detects the rotational angle of the motor, the resolver is used well. Although the resolver is known as the robust angle detection device, the resolver is also required for redundancy from the request of the fault tolerance of the motor drive system.

Then, PLT 1 discloses the dual system resolver which is provided with the first system excitation winding and output winding, and the second system excitation winding and output winding. In PLT 2, two resolvers are excited asynchronous with each other by two magnetizing means, and the rotational angle of each resolver is calculated based on the sampling result of each resolver output sampled at each predetermined sampling cycle. In the technology of PLT 2, the excitation frequency of each resolver by the two magnetizing means and the sampling frequency for sampling the output of each resolver are set so that the difference of the excitation frequency between resolvers becomes an integral multiple of the sampling frequency. And, the output of each resolver excited by the two magnetizing means is sampled at the peak timings of output amplitude. It is described in PLT 2 that since the sampling of each resolver output is always performed at the peak timings of output amplitude, the rotational angle is always calculated uniformly with high accuracy.

CITATION LIST

Patent Literature

PLT 1: JP 2000-18968 A
PLT 2: JP 2009-210281 A

SUMMARY OF INVENTION

Technical Problem

However, in the redundant system resolver like PLT 1 and PLT 2, even if electrically insulated between the first system and the second system, a magnetic interference occurs. Against this, in the technology of PLT 2, after calculating the difference between the excitation frequency fa of the first system, and the excitation frequency fb of the second system by the pulsation cycle calculation unit, the sampling frequencies of the first system and the second system are adjusted by the sampling timing controller. Therefore, in the technology of PLT 2, it is necessary to communicate between the first system ECU and the second system ECU and perform synchronous control. The harness cost and the processing load required for this communication between the first system and the second system, and the synchronous control becomes a problem.

Thus, even using the redundant system resolver in which the magnetic interference between systems occurs, it is desirable to provide an angle detection apparatus which can reduces the influence of the magnetic interference and can calculate the rotational angle with good accuracy, without performing synchronous control between systems in real time.

Solution to Problem

An angle detection apparatus according to the present disclosure including:

a resolver that is provided with a first system excitation winding, first system two output windings, a second system excitation winding, and second system two output windings, in which magnetic interference occurs between a first system and a second system;

a first system excitation unit that applies AC voltage of a first cycle to the first system excitation winding;

a second system excitation unit that applies AC voltage of a second cycle longer than the first cycle, to the second system excitation winding;

a first system output signal detection unit that detects periodically output signals of the first system two output windings at preliminarily set detection timing;

a first system removal processing unit that performs a second cycle component removal processing which removes component of the second cycle, to detection values of the output signals of the first system two output windings; and a first system angle calculation unit that calculates a first angle of the resolver, based on the detection values of the output signals of the first system two output windings after the second cycle component removal processing.

Advantage of Invention

According to the angle detection apparatus of the present disclosure, the component of the second cycle generated by the second system excitation winding can be removed from the detection values of the output signals of the first system two output windings. And, the angle of the rotor can be calculated with good accuracy, based on the detection values of the output signals of the first system two output windings after the second cycle component removal processing. At this time, it is not necessary to perform a synchronous control with processing of the second system in real time, and the increase in processing load and the like can be suppressed.

BRIEF DESCRIPTION OF THE DRAWINGS

FIG. 12 is a schematic perspective view of the resolver according to Embodiment 3.

DETAILED DESCRIPTION OF THE EMBODIMENTS

1. Embodiment 1

Figure 1:
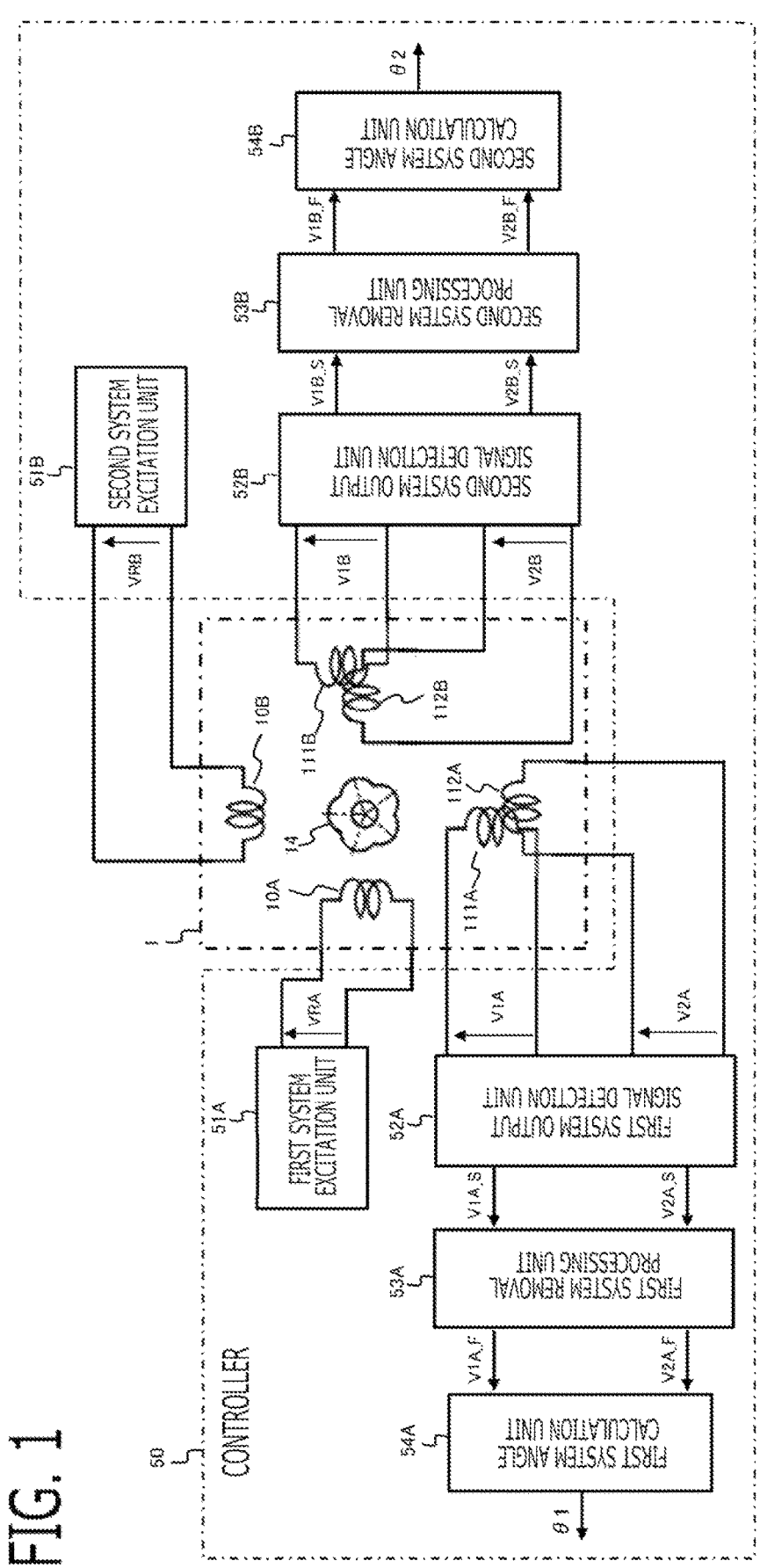
FIG. 1 is a schematic configuration diagram of the angle detection apparatus according to Embodiment 1.

An angle detection apparatus according to Embodiment 1 will be explained with reference to drawings. FIG. 1 is a schematic configuration diagram of the angle detection apparatus according to the present embodiment.

1-1. Resolver 1

The angle detection apparatus is provided with a resolver 1. The resolver 1 is provided with a first system excitation winding 10A, first system two output windings 111A, 112A (referred to also as a first system first output winding 111A and a first system second output winding 112A), a second system excitation winding 10B, and second system two output windings 111B, 112B (referred to also as a second system first output winding 111B and a second system second output winding 112B). A magnetic interference occurs between the first system windings and the second system windings. That is to say, by the magnetic flux generated by the first system excitation winding 10A, an induced voltage is generated not only in the first system two output windings 111A, 112A, but also in the second system two output windings 111B, 112B; and by the magnetic flux generated by the second system excitation winding 10B, an induced voltage is generated not only in the second system two output windings 111B, 112B, but also in the first system two output windings 111A, 112A.

Figure 2:
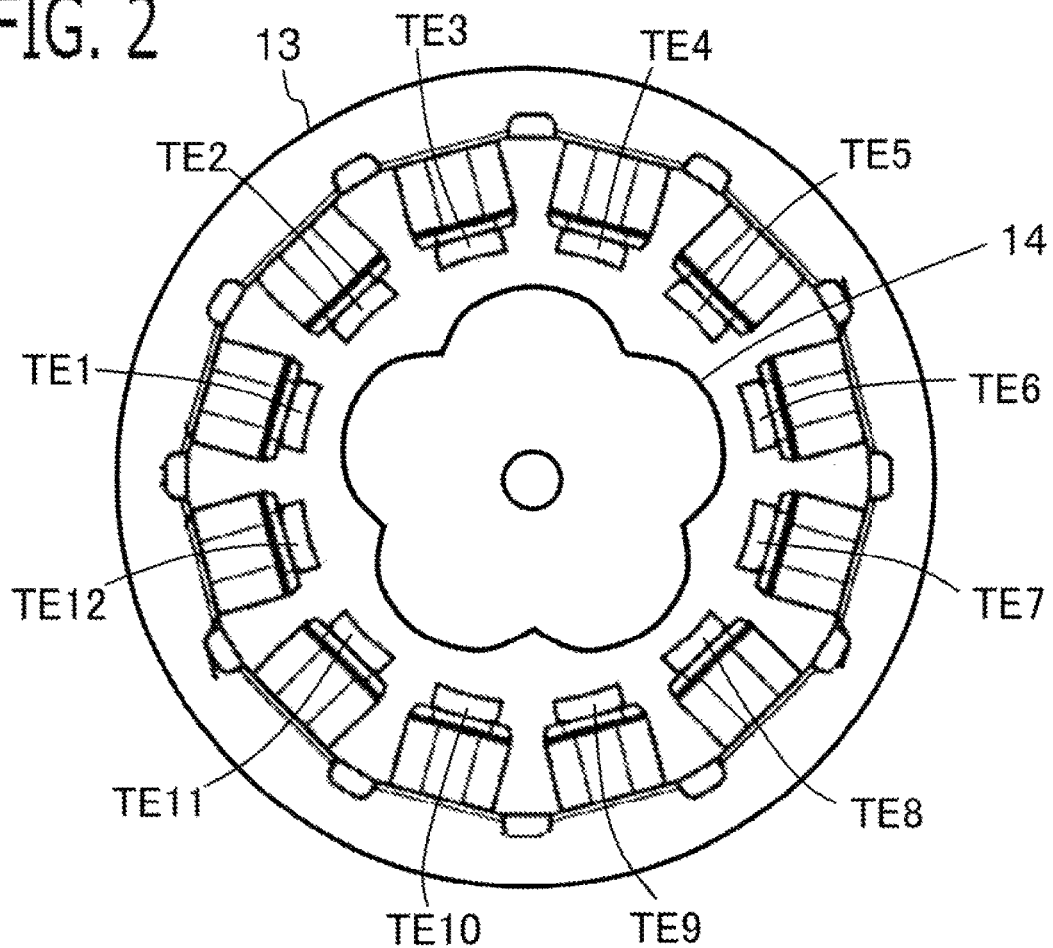
FIG. 2 is a side view of the resolver viewed in the axial direction according to Embodiment 1.

As shown in FIG. 2, the first system excitation winding 10A, the first system two output windings 111A, 112A, the second system excitation winding 10B, and the second system two output windings 111B, 112B are wound around the same one stator 13. The rotor 14 is arranged in the radial-direction inner side of the stator 13. The rotor 14 is provided with a plurality of projection parts which are arranged equally in the circumferential direction on the peripheral part of the rotor. The projection height to the radial-direction outside of the projection parts is formed so that the gap permeance between the stator 13 and the rotor 14 changes in sine wave shape according to rotation. That is to say, the resolver 1 is a variable reluctance (VR) type resolver. In the present embodiment, the five projection parts are provided, and the axial double angle is 5. Therefore, whenever the rotor rotates once in the mechanical angle, it rotates 5 times in the electrical angle.

Figure 6:
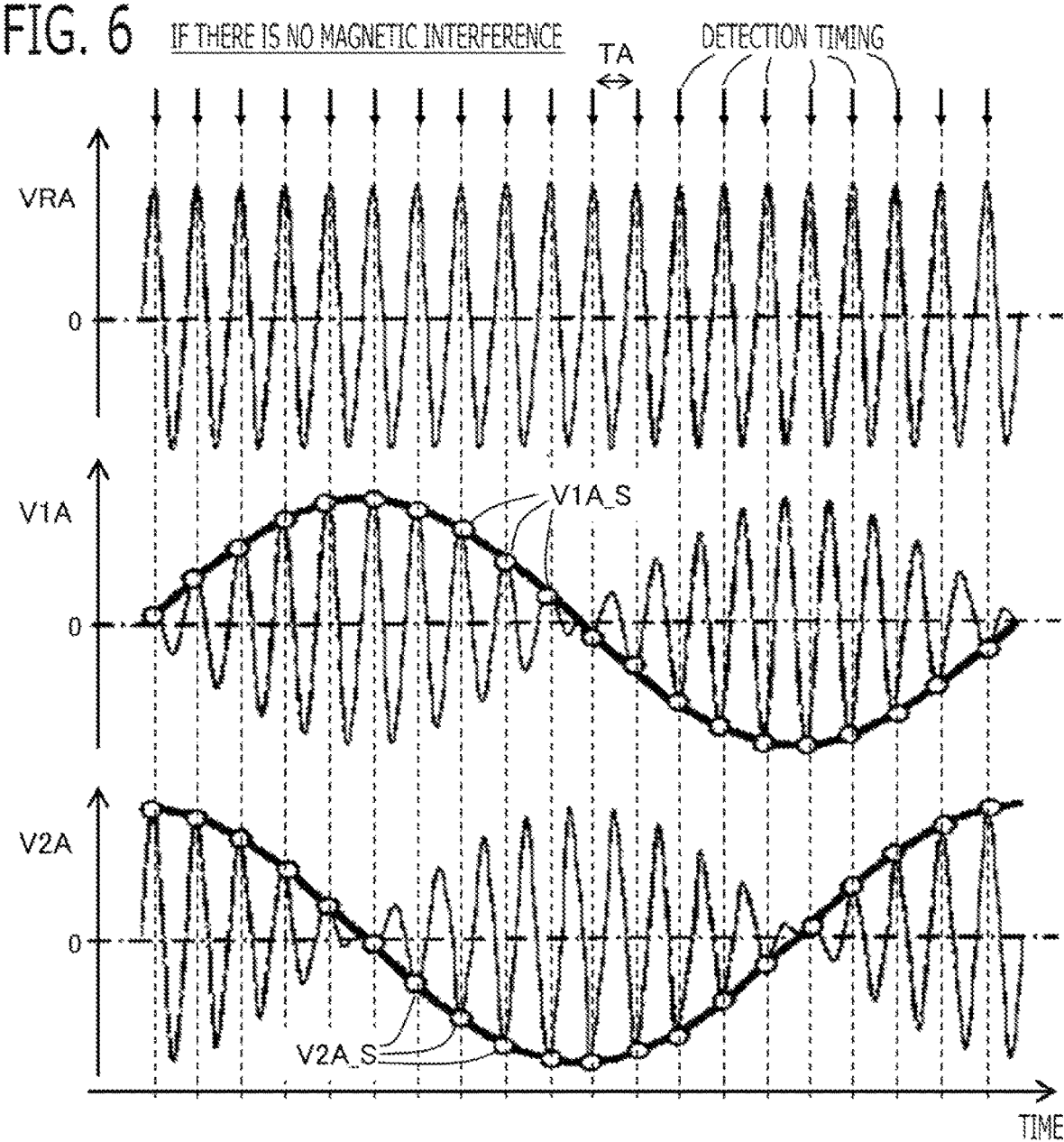
FIG. 6 is a time chart for explaining the first system detection timing when supposing that there is no magnetic interference between systems according to Embodiment 1.

As showing an example supposed that there is no magnetic interference between systems in FIG. 6, when the rotor rotates in the state where the AC voltage VRA is applied to the first system excitation winding 10A, the amplitude of AC voltage V1A induced by the first system first output winding 111A and the amplitude of AC voltage V2A induced by the first system second output winding 112A change in a sine wave shape (or in a cosine wave shape), according to the rotational angle (the gap permeance) in the electrical angle of the rotor. The first system first output winding 111A and the first system second output winding 112A are wound around the positions of the circumferential direction of the stator 13 so that the amplitudes of those AC voltages are mutually different 90 degrees in the electrical angle. Similarly, the second system first output winding 111B and the second system second output winding 112B are wound around the positions of the circumferential direction of the stator 13 so that the amplitudes of those induced AC voltages are mutually different 90 degrees in the electrical angle.

In the present embodiment, as shown in FIG. 2, the stator 13 is provided with 12 teeth arranged equally in the circumferential direction; the first system windings are wound around the first teeth TE1 to the sixth teeth TE6; and the second system windings are wound around the seventh teeth TE7 to the twelfth teeth TE12. The first system excitation winding 10A is distributed and wound around the first teeth TE1 to the sixth teeth TE6. The first system first output winding 111A and the first system second output winding 112A are distributed and wound around the first teeth TE1 to the sixth teeth TE6 so that the amplitudes of those induced AC voltages are mutually different 90 degrees in the electrical angle. Similarly, the second system excitation winding 10B is distributed and wound around the seventh teeth TE7 to the twelfth teeth TE12. The second system first output winding 111B and the second system second output winding 112B are distributed and wound around the seventh teeth TE7 to the twelfth teeth TE12 so that the amplitudes of those induced AC voltages are mutually different 90 degrees in the electrical angle.

The first system excitation winding 10A wound around the plurality of teeth is connected in series between teeth; and the two terminals of the first system excitation winding 10A connected in series are connected to the controller 50 (the first system excitation unit 51A) described below. Similarly, the two terminals of the first system first output winding 111A connected in series between teeth are connected to the controller 50 (the first system output signal detection unit 52A) described below. The two terminals of the first system second output winding 112A connected in series between teeth are connected to the controller 50 (the first system output signal detection unit 52A) described below. The two terminals of the second system excitation winding 10B connected in series are connected to the controller 50 (the second system excitation unit 51B) described below. Similarly, the two terminals of the second system first output winding 111B connected in series between teeth are connected to the controller 50 (the second system output signal detection unit 52B) described below. The two terminals of the second system second output winding 112B connected in series between teeth are connected to the controller 50 (the second system output signal detection unit 52B) described below.

The number of projection parts (axial double angle) and the number of teeth may be set to any numbers. The first system windings and the second system windings may not be arranged being divided into two in the circumferential direction, but may be arranged being distributed in the circumferential direction.

1-2. Controller 50

Figure 3:
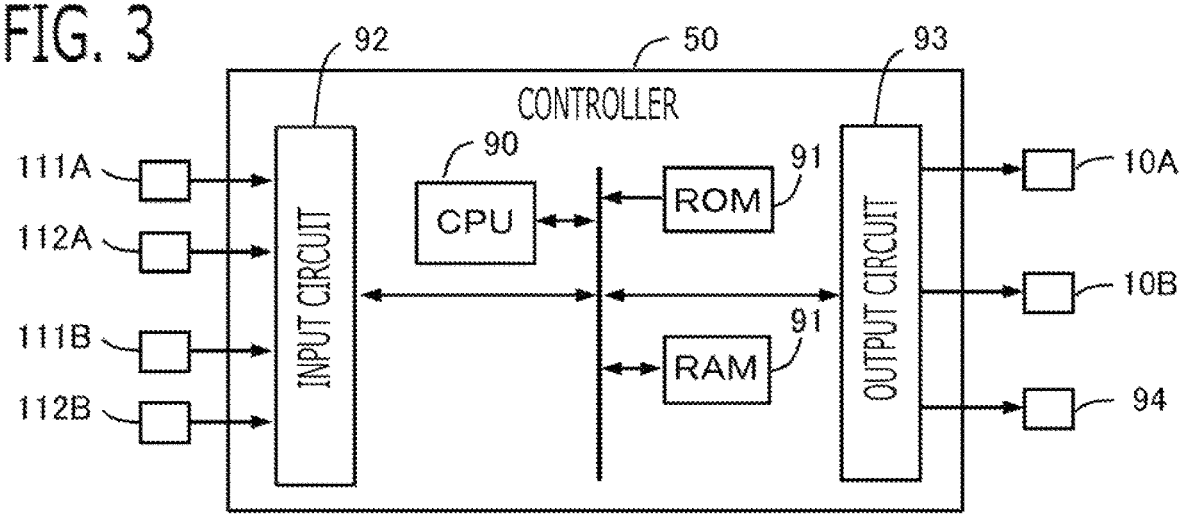
FIG. 3 is a hardware configuration diagram of the controller according to Embodiment 1.

The angle detection apparatus is provided with a controller 50. As shown in FIG. 1, the controller 50 is provided with a first system excitation unit 51A, a first system output signal detection unit 52A, a first system removal processing unit 53A, a first system angle calculation unit 54A, a second system excitation unit 51B, a second system output signal detection unit 52B, a second system removal processing unit 53B, and a second system angle calculation unit 54B. Each function of the controller 50 is realized by processing circuits provided in the controller 50. Specifically, as shown in FIG. 3, the controller 50 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The first system first output winding 111A, the first system second output winding 112A, the second system first output winding 111B, and the second system second output winding 112B are connected to the input circuit 92. The input circuit 92 is provided with an A/D converter and the like for inputting the output voltages of these windings into the arithmetic processor 90. The output circuit 93 is connected with the first system excitation winding 10A and the second system excitation winding 10B, and is provided with driving circuits, such as switching devices for applying the AC voltage VRA to these windings. A lowpass filter circuit may be provided in the output side of the switching device. The output circuit 93 is provided with signal output circuits, such as a communication circuit which transmits the first angle θ1 and the second angle θ2 which were calculated to the external controller 94.

Then, the arithmetic processor 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51A to 54B included in the controller 50 are realized. Setting data utilized in the control units 51A to 54B are stored, as part of software items (programs), in the storage apparatus 91 such as a ROM. Each function of the controller 50 will be described in detail below.

1-2-1. Excitation Unit

The first system excitation unit 51A applies AC voltage VRA (in this example, AC voltage VRA of a sine wave) of first cycle TA to the first system excitation winding 10A. In the present embodiment, the first system excitation unit 51A calculates an AC voltage command of the first cycle TA, and generates the PWM signal (Pulse Width Modulation) which turns on and off the switching device for the first system excitation winding provided in the output circuit 93, based on the comparison result between the AC voltage command and the triangular wave. When the switching device is turned on, the power source voltage is applied to the first system excitation winding 10A side, and when the switching device is turned off, the application of the power source voltage stops.

The second system excitation unit 51B applies AC voltage VRB (in this example, AC voltage VRB of a sine wave) of second cycle TB to the second system excitation winding 10B. As described later, the second cycle TB is set to a cycle longer than the first cycle TA. In the present embodiment, the second system excitation unit 51B calculates an AC voltage command of the second cycle TB, and generates the PWM signal (Pulse Width Modulation) which turns on and off the switching device for the second system excitation winding provided in the output circuit 93, based on the comparison result between the AC voltage command and the triangular wave.

1-2-2. Calculation of First Angle θ1

<First System Output Signal Detection Unit 52A>

The first system output signal detection unit 52A detects periodically the output signals V1A, V2A of the first system two output windings 111A, 112A at preliminarily set detection timing (hereinafter, referred to also as the first system detection timing).

<Problem Due to Magnetic Interference Between Systems>

Figure 4:
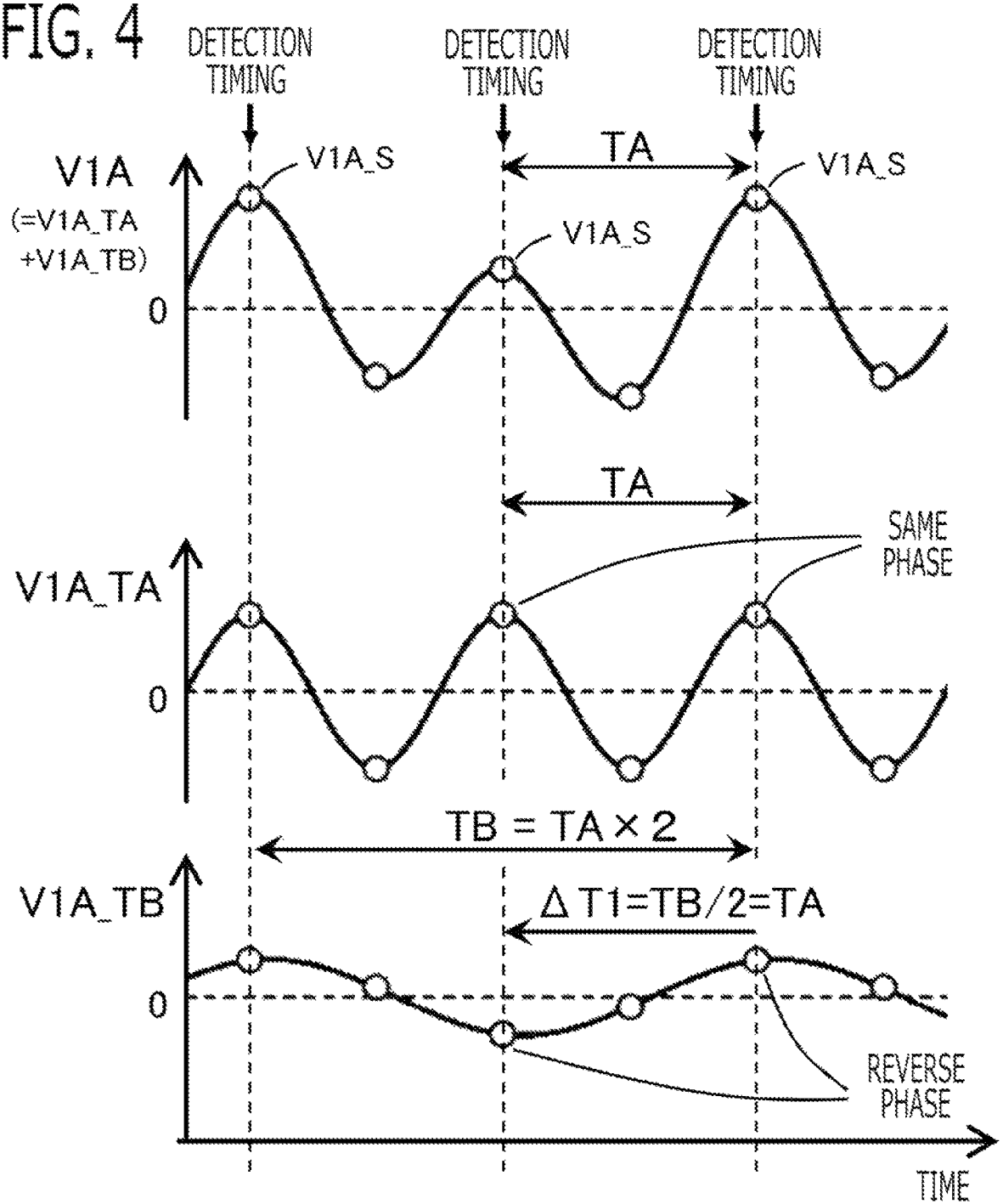
FIG. 4 is a time chart for explaining the second cycle component removal processing of the first system according to Embodiment 1.

As showing an example of the output signal V1A of the first system first output winding in FIG. 4, the components of the second cycle V1A_TB, V2A_TB induced by the magnetic flux of the second cycle TB excited in the second system excitation winding 10B are superimposed on each of the output signals V1A, V2A of the first system two output windings 111A, 112A, due to the magnetic interference between systems. The output signal V1A of the first system first output winding is shown in the upper row graph of FIG. 4; the component of the first cycle V1A_TA induced by the magnetic flux of the first system excitation winding 10A included in the output signal V1A of the first system first output winding is shown in the middle graph; and the component of the second cycle V1A_TB induced by the magnetic flux of the second system excitation winding 10B included in the output signal V1A of the first system first output winding is shown in the lower row graph. The output signal V1A of the first system first output winding becomes a signal obtained by totaling the component of the first cycle V1A_TA and the component of the second cycle V1A_TB, and if the angle is calculated with these signals, the detection error will occur. Therefore, in order to suppress the detection error of the angle, it is necessary to remove the component of the second cycle V1A_TB from the output signal V1A of the first system first output winding.

<Second Cycle Component Removal Processing>

Then, the first system removal processing unit 53A performs a second cycle component removal processing which removes (decreases) the component of the second cycle, to the detection values V1A_S, V2A_S of the output signals of the first system two output windings. Then, the first system angle calculation unit 54A calculates the first angle θ1 based on the detection values V1A_F, V2A_F of the output signals of the first system two output windings after the second cycle component removal processing.

In the present embodiment, based on the principle explained in the following, the second cycle component removal processing is performed. As shown in the lower row graph of FIG. 4, in the component of the second cycle V1A_TB of the output signal of the first system first output winding, the phase is reversed and the sign of plus or minus is reversed in a cycle (for example, half cycle TB/2 of the second cycle) obtained by adding an integral multiple of the second cycle TB to a half cycle TB/2 of the second cycle.

Then, as the second cycle component removal processing, the first system removal processing unit 53A adds the detection values V1A_S, V2A_S of the output signals of the first system two output windings detected at this time detection timing, and the detection values V1A_Sold, V2A_Sold of the output signals of the first system two output windings detected at the detection timing earlier by the first system removal processing interval ΔT1 than this time detection timing. The first system removal processing interval ΔT1 is set as shown in the next equation. Herein, M is an integer greater than or equal to 0. In the present embodiment, M is set to 0, and the first system removal processing interval ΔT1 is set to the half cycle TB/2 of the second cycle.

$$\Delta T1 = TB/2 + TB \times M \tag{1}$$

Figure 5:
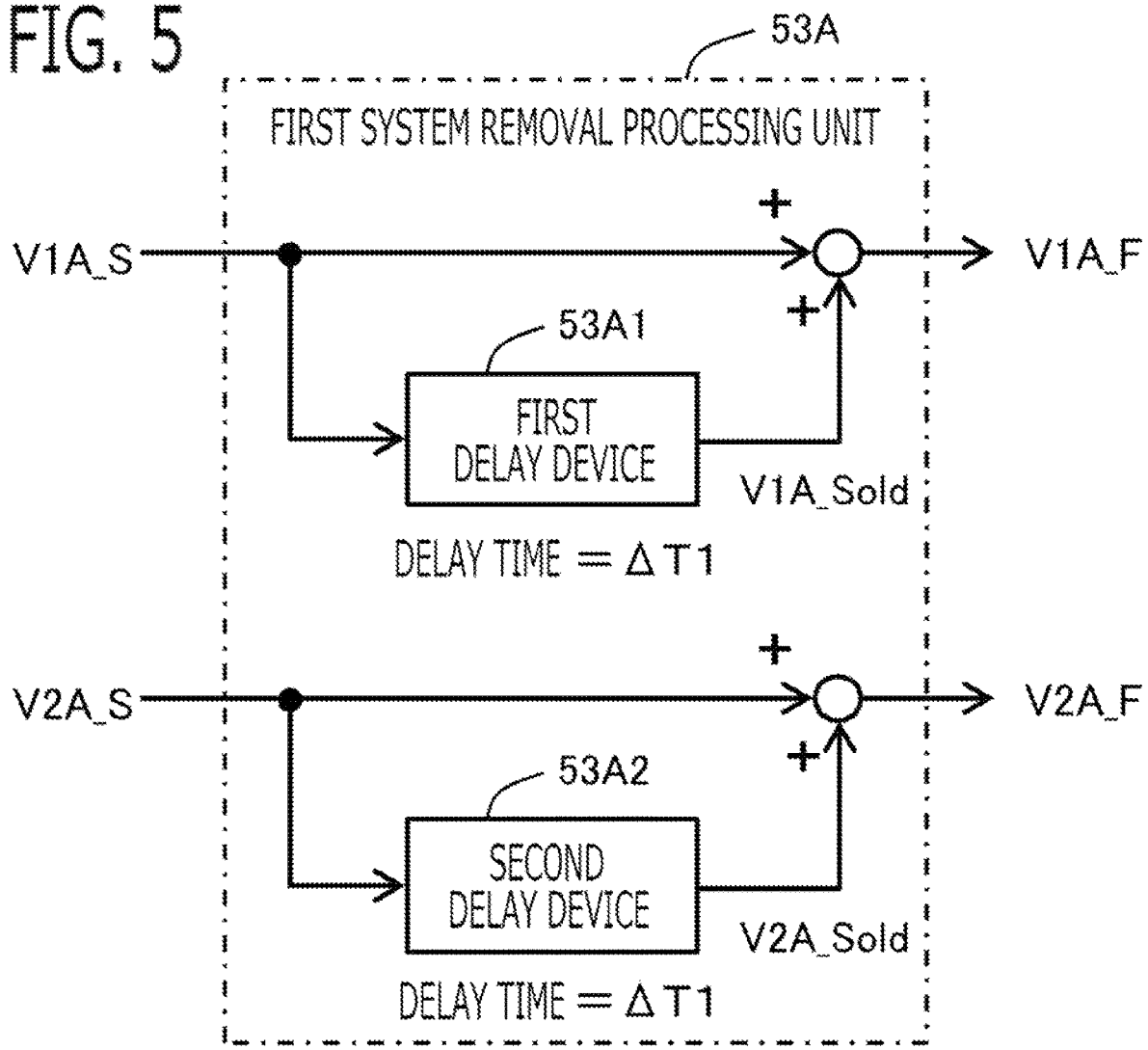
FIG. 5 is a block diagram of the first system removal processing unit according to Embodiment 1.

The first system removal processing unit 53A is constituted, for example, as shown in FIG. 5. The first system removal processing unit 53A is provided with a first delay device 53A1 which delays the detection value V1A_S of the output signal of the first system first output winding by the first system removal processing interval ΔT1, and outputs; adds the detection value V1A_S of the output signal of the first system first output winding, and the output V1A_Sold of the first delay device 53A1; and calculates the detection value V1A_F of the output signal of the first system first output winding after the second cycle component removal processing. Similarly, the first system removal processing unit 53A is provided with a second delay device 53A2 which delays the detection value V2A_S of the output signal of the first system second output winding by the first system removal processing interval ΔT1, and outputs; adds the detection value V2A_S of the output signal of the first system second output winding, and the output V2A_Sold of the second delay device 53A2; and calculates the detection value V2A_F of the output signal of the first system second output winding after the second cycle component removal processing.

Then, the first system angle calculation unit 54A calculates the first angle θ1 based on the detection values V1A_F, V2A_F of the output signals of the first system two output windings after addition.

According to this configuration, the two components of the second cycle whose the signs of plus or minus are reversed with each other are added, and the two components of the second cycle are canceled with each other. Accordingly, in the detection values V1A_F, V2A_F of the output signals of the first system two output windings after addition, the component of the second cycle is removed. Then, based on the detection values after removing the component of the second cycle, the first angle 91 can be calculated with good accuracy.

In the present embodiment, the second cycle TB is set to an even multiple of the first cycle TA, as shown in the next equation. Herein, N is an integer greater than or equal to one. In the present embodiment, N is set to 1, and the second cycle TB is set to a twice of the first cycle TA.

$$TB = TA \times 2 \times N \tag{2}$$

According to this configuration, as shown in the next equation in which the equation (2) is substituted in the equation (1), the first system removal processing interval ΔT1 becomes an integral multiple of the first cycle TA.

$$\Delta T1 = TA \times (N + 2 \times N \times M) \tag{3}$$

Therefore, among the detection values V1A_S, V2A_S of the output signals of the first system two output windings, values before and after the integral multiple of the first cycle TA are added. Then, as shown in FIG. 4, since the added two components of the first cycle have the same phase, and become the equivalent values with the same sign of plus or minus, the detection values V1A_F, V2A_F of the output signals of the first system two output windings after addition correspond to the double values of the components of the first cycle V1A_TA, V2A_TA included in the detection values, respectively.

$$V1A\_F \approx 2 \times V1A\_TA$$

$$V2A\_F \approx 2 \times V2A\_TA \tag{4}$$

Accordingly, in the equation (5) and the equation (6) described below, since 2 is canceled by calculating a ratio between the detection value V1A_F of the output signal of the first system first output winding after addition and the detection value V2A_F of the output signal of the first system second output winding after addition, the first angle θ1 can be calculated with good accuracy.

In the present embodiment, M is set to 0, and N is set to 1. Therefore, the first system removal processing unit 53A adds the detection values V1A_S, V2A_S of the output signals of the first system two output windings detected at this time detection timing, and the detection values V1A_Sold, V2A_Sold of the output signals of the first system two output windings detected before the first cycle TA (the half cycle TB/2 of the second cycle).

In the present embodiment, the first system output signal detection unit 52A detects the output signals V1A, V2A of the first system two output windings at a timing when the AC voltage VRA of the first cycle TA applied to the first system excitation winding 10A becomes the maximum value or the minimum value (in this example, the maximum value). The first system output signal detection unit 52A detects the output signals V1A, V2A of the first system two output windings at every the first cycle TA when the AC voltage VRA becomes the maximum value. That is to say, the first system detection timing is set to the timing at every the first cycle TA.

FIG. 6 shows an example in which unlike the present embodiment, there is no magnetic interference between systems, and the component of the second cycle is not superimposed on the output signals V1A, V2A of the first system two output windings. At every the first cycle TA when the AC voltage VRA of the first cycle TA becomes the maximum value, the output signals V1A, V2A of the first system two output windings are detected. Therefore, the component of the first cycle included in the detection values of the output signals of the first system two output windings becomes the maximum value or the minimum value of the component of the first cycle which is vibrating at the first cycle TA. Therefore, the amplitude of the component of the first cycle included in the detection values of the output signals of the first system two output windings can be maximized, the detection sensitivity of the component of the first cycle to the noise component can be increased, and the detection accuracy can be increased. The first system output signal detection unit 52A may detect the output signals V1A, V2A of the first system two output windings at the timing when the AC voltage VRA of the first cycle TA becomes other than the maximum value or the minimum value, excepting the timing when the AC voltage VRA of the first cycle TA becomes the vibration center value (node).

<Calculation of the First Angle θ1>

As shown in FIG. 6, if there is no magnetic interference between systems, the detection values V1A_S, V2A_S of the output signals of the first system two output windings become the sine wave and cosine wave which are mutually different 90 degrees in the electrical angle, and the first angle θ1 is calculated by calculating an arc tangent of a ratio of them. Even if there is the magnetic interference between systems, by using the detection values V1A_F, V2A_F of the output signals of the first system two output windings after the second cycle component removal processing, the first angle θ1 can be calculated.

In the present embodiment, as shown in a next equation, the first system angle calculation unit 54A calculates the first angle θ1 by calculating an arc tangent (an arc tangent function) of a ratio between the detection value V1A_F of the output signal of the first system first output winding and the detection value V2A_F of the output signal of the first system second output winding after the second cycle component removal processing.

$$\theta1 = \tan^{-1}(V1A\_F/V2A\_F) \quad (5)$$

As shown in the equation (4), the detection values V1A_F, V2A_F of the output signals of the first system two output windings after the second cycle component removal processing correspond to the double values of the components of the first cycle V1A_TA, V2A_TA included in the detection values, respectively. Therefore, as shown in a next equation in which the equation (4) is substituted in the equation (5), the first angle θ1 is calculated with good accuracy by the ratio of the components of the first cycle V1A_TA, V2A_TA included in the detection values.

$$\theta1 \approx \tan^{-1}\{(2 \times V1A\_TA)/(2 \times V2A\_TA)\} = \tan^{-1}(V1A\_TA/V2A\_TA) \quad (6)$$

1-2-3. Calculation of Second Angle θ2

<Second System Output Signal Detection Unit 52B>

The second system output signal detection unit 52B detects periodically the output signal V1B, V2B of the second system two output windings 111B, 112B at preliminarily set detection timing (hereinafter, referred to also as the second system detection timing).

<Problem Due to Magnetic Interference Between Systems>

Figure 7:
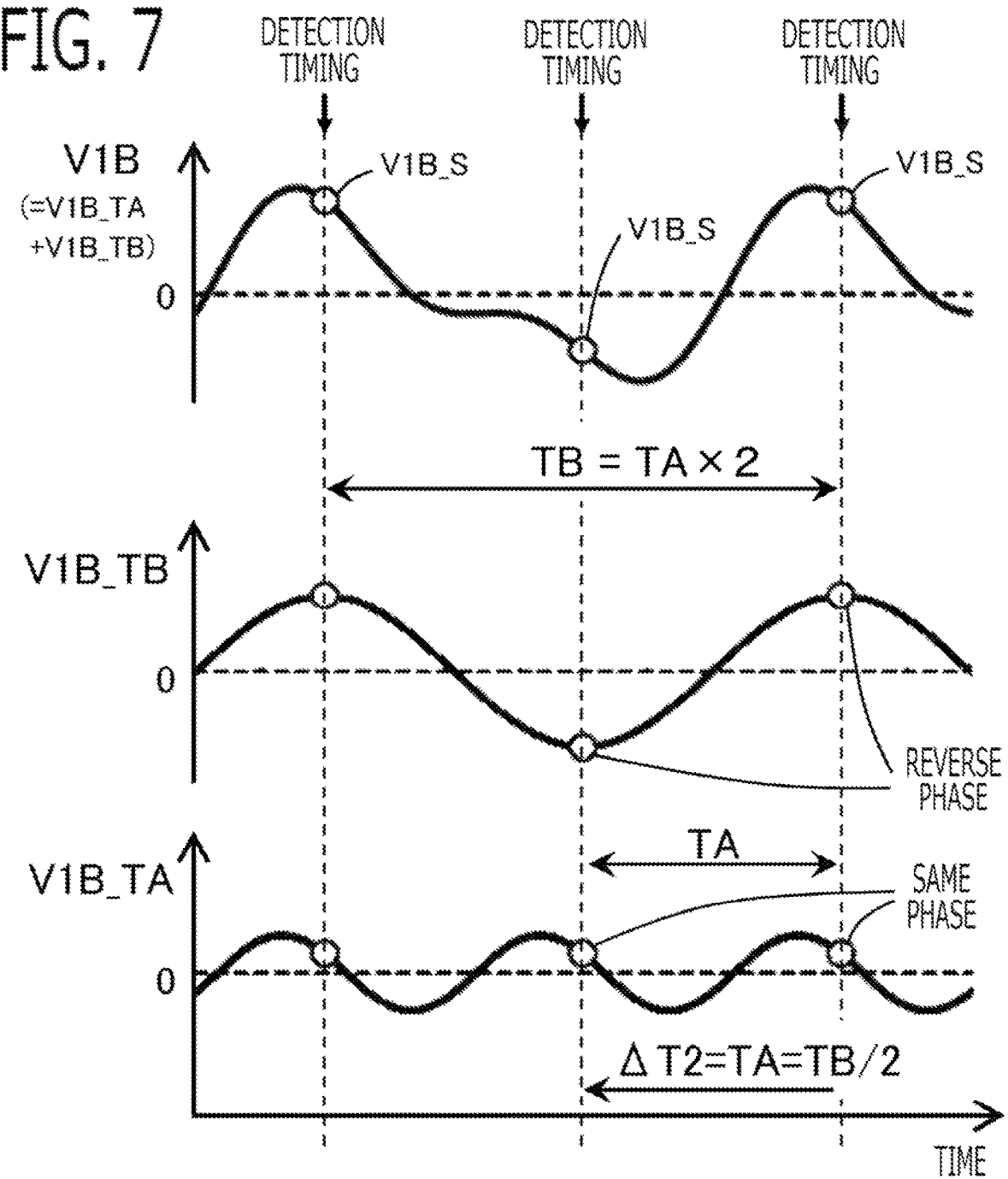
FIG. 7 is a time chart for explaining the first cycle component removal processing of the second system according to Embodiment 1.

As showing an example of the output signal V1B of the second system first output winding in FIG. 7, the components of the first cycle induced by the magnetic flux of the first cycle TA excited in the first system excitation winding 10A are superimposed on each of the output signals V1B, V2B of the second system two output windings 111B, 112B, due to the magnetic interference between systems. The output signal V1B of the second system first output winding is shown in the upper row graph of FIG. 7; the component of the second cycle V1B_TB induced by the magnetic flux of the second system excitation winding 10B included in the output signal V1B of the second system first output winding is shown in the middle graph; and the component of the first cycle V1B_TA induced by the magnetic flux of the first system excitation winding 10A included in the output signal V1B of the second system first output winding is shown in the lower row graph. The output signal V1B of the second system first output winding becomes a signal obtained by totaling the component of the second cycle V1B_TB and the component of the first cycle V1B_TA, and if the angle is calculated with these signals, the detection error will occur. Therefore, in order to suppress the detection error of the angle, it is necessary to remove the component of the first cycle V1B_TA from the output signal V1B of the second system first output winding.

<First Cycle Component Removal Processing>

Then, the second system removal processing unit 53B performs a first cycle component removal processing which removes (decreases) the component of the first cycle, to the detection values V1B_S, V2B_S of the output signals of the second system two output windings. Then, the second system angle calculation unit 54B calculates the second angle θ2 based on the detection values V1B_F, V2B_F of the output signals of the second system two output windings after the first cycle component removal processing.

In the present embodiment, based on the principle explained in the following, the first cycle component removal processing is performed. As shown in the lower row graph of FIG. 7, the component of the first cycle V1B_TA of the output signal of the second system first output winding becomes the same phase and becomes the equivalent value with the same sign of plus or minus at an integral multiple cycle of the first cycle TA (for example, the first cycle TA).

Then, as the first cycle component removal processing, the second system removal processing unit 53B performs a subtraction processing that calculates differences between the detection values V1B_S, V2B_S of the output signals of the second system two output windings detected at this time detection timing, and the detection values V1B_Sold, V2B_Sold of the output signals of the second system two output windings detected at the detection timing earlier by the second system removal processing interval ΔT2 than this time detection timing. The second system removal processing interval ΔT2 is set to an integral multiple of the first cycle TA, as shown in a next equation. Herein, P is an integer greater than or equal to one. In the present embodiment, P is set to 1, and the second system removal processing interval ΔT2 is set to the first cycle TA.

$$\Delta T2 = TA \times P \quad (7)$$

Figure 8:
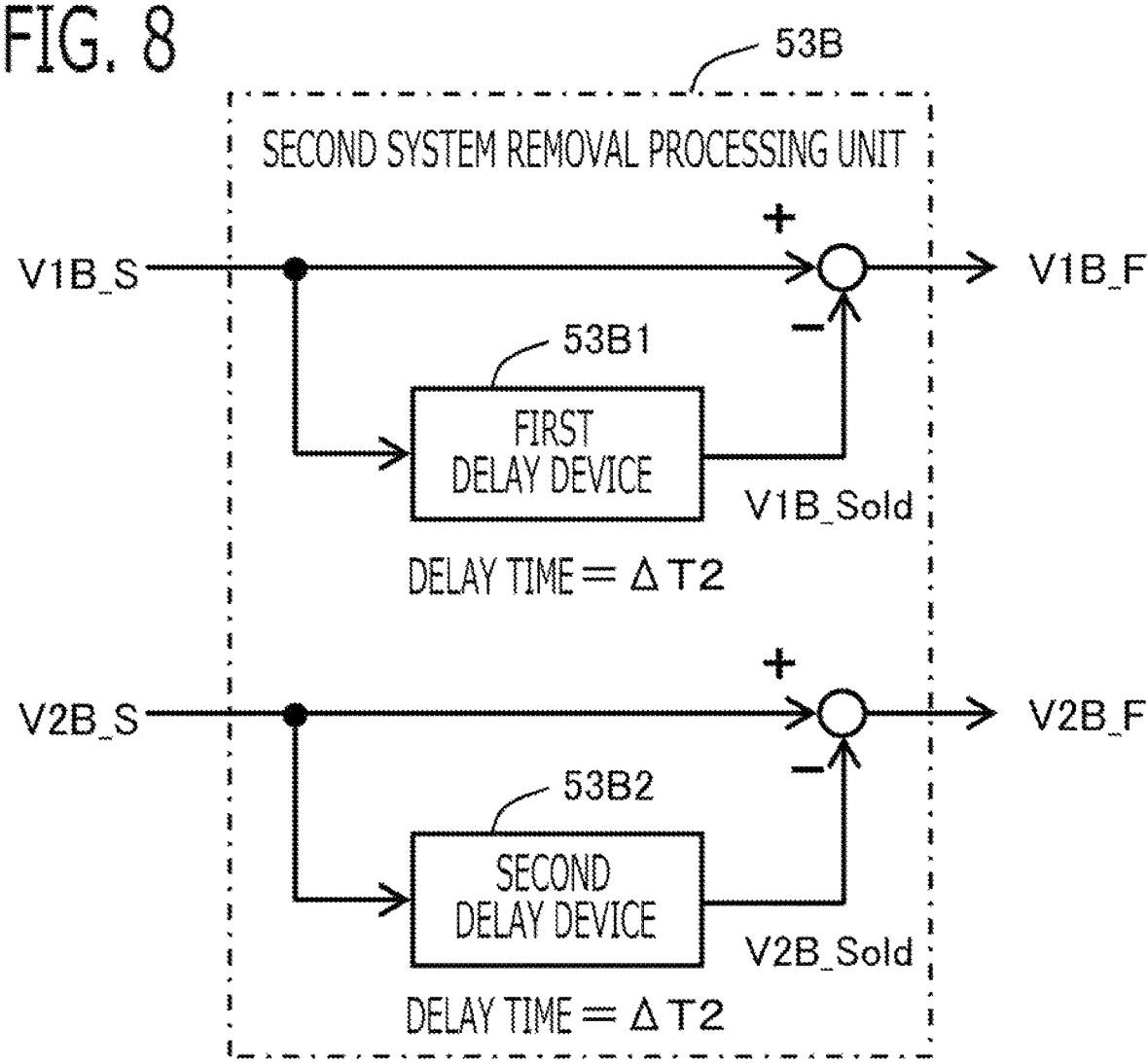
FIG. 8 is a block diagram of the second system removal processing unit according to Embodiment 1.

The second system removal processing unit 53B is constituted, for example, as shown in FIG. 8. The second system removal processing unit 53B is provided with a first delay device 53B1 which delays the detection value V1B_S of the output signal of the second system first output winding by the second system removal processing interval ΔT2, and outputs; subtracts the output V1B_Sold of the first delay device 53B1 from the detection value V1B_S of the output signal of the second system first output winding; and calculates the detection value V1B_F of the output signal of the second system first output winding after the first cycle component removal processing. Similarly, the second system removal processing unit 53B is provided with a second delay device 53B2 which delays the detection value V2B_S of the output signal of the second system second output winding by the second system removal processing interval ΔT2, and outputs; subtracts the output V2B_Sold of the second delay device 53B2 from the detection value V2B_S of the output signal of the second system second output winding; and calculates the detection value V2B_F of the output signal of the second system second output winding after the first cycle component removal processing.

Then, the second system angle calculation unit 54B calculates the second angle θ2 based on the detection values V1B_F, V2B_F of the output signals of the second system two output windings after the subtraction processing.

According to this configuration, the two components of the first cycle which become the equivalent values with the same sign of plus or minus with each other are subtracted, and the two components of the first cycle are canceled with each other. Accordingly, in the detection values V1B_F, V2B_F of the output signals of the second system two output windings after the subtraction processing, the components of the first cycle are removed. Then, based on the detection values after removing the components of the first cycle, the second angle θ2 can be calculated with good accuracy.

In the present embodiment, the second cycle TB is set to an even multiple of the first cycle TA, as shown in the next equation. Herein, N is an integer greater than or equal to one. In the present embodiment, N is set to 1, and the second cycle TB is set to the twice of the first cycle TA.

$$TB=TA\times 2\times N \quad (8)$$

The second system removal processing interval ΔT2 is set as shown in the next equation. Herein, L is an integer greater than or equal to 0. In the present embodiment, L is set to 0, and the second system removal processing interval ΔT2 is set to the half cycle TB/2 of the second cycle.

$$\Delta T2=TB/2+TB\times L \quad (9)$$

Even in this case, if the equation (8) is substituted in the equation (9), the second system removal processing interval ΔT2 becomes an integral multiple of the first cycle TA similarly to the equation (7), as shown in a next equation. Therefore, as mentioned above, by the first cycle component removal processing (the subtraction processing), the components of the first cycle can be removed.

$$\Delta T2=TA\times N\times(1+2\times L) \quad (10)$$

By setting the second system removal processing interval ΔT2 like the equation (9), in the two components of the second cycle which will be subtracted by the subtraction processing, the phases are reversed and the signs of plus or minus are reversed, as shown in FIG. 7. Therefore, the detection values V1B_F, V2B_F of the output signals of the second system two output windings after the subtraction processing correspond to the double values of the components of the second cycle V1B_TB, V2B_TB included in the detection values, respectively.

$$V1B\_F\approx 2\times V1B\_TB$$

$$V2B\_F\approx 2\times V2B\_TB \quad (11)$$

Accordingly, in the equation (12) and the equation (13) described below, since 2 is canceled by calculating a ratio between the detection value V1B_F of the output signal of the second system first output winding after the subtraction processing and the detection value V2B_F of the output signal of the second system second output winding after the subtraction processing, the second angle θ2 can be calculated with good accuracy.

In the present embodiment, L is set to 0, N is set to 1, and P is set to 1. Therefore, the second system removal processing unit 53B subtracts the detection values V1B_Sold, V2B_Sold of the output signals of the second system two output windings detected before the half cycle TB/2 of the second cycle (the first cycle TA), from the detection values V1B_S, V2B_S of the output signals of the second system two output windings detected at this time detection timing.

In the present embodiment, the second system output signal detection unit 52B detects the output signals V1B, V2B of the second system two output windings at a timing when the AC voltage VRB of the second cycle TB applied to the second system excitation winding 10B becomes the maximum value or the minimum value. The second system output signal detection unit 52B detects the output signals V1B, V2B of the second system two output windings at every the half cycle TB/2 of the second cycle when the AC voltage VRB becomes the maximum value or the minimum value.

According to this configuration, similar to the first system, the component of the second cycle included in the detection values of the output signals of the second system two output windings becomes the maximum value or the minimum value of the component of the second cycle which is vibrating at the second cycle TB. Therefore, the amplitude of the component of the second cycle included in the detection values of the output signals of the second system two output windings can be maximized, the detection sensitivity of the component of the second cycle to the noise component can be increased, and the detection accuracy can be increased. The second system output signal detection unit 52B may detect the output signals V1B, V2B of the second system two output windings at the timing when the AC voltage VRB of the second cycle TB becomes other than the maximum value or the minimum value, excepting the timing when the AC voltage VRB of the second cycle TB becomes the vibration center value (node).

<Calculation of the Second Angle θ2>

In the present embodiment, similar to the first system, as shown in a next equation, the second system angle calculation unit 54B calculates the second angle θ2 by calculating an arc tangent (an arc tangent function) of a ratio between the detection value V1B_F of the output signal of the second system first output winding and the detection value V2B_F of the output signal of the second system second output winding after the first cycle component removal processing.

$$\theta 2=\tan^{-1}(V1B\_F/V2B\_F) \quad (12)$$

As shown in the equation (11), the detection values V1B_F, V2B_F of the output signals of the second system two output windings after the first cycle component removal processing correspond to the double values of the components of the second cycle V1B_TB, V2B_TB included in the detection values, respectively. Therefore, as shown in a next equation in which the equation (11) is substituted in the equation (12), the second angle θ2 is calculated with good accuracy by the ratio of the components of the second cycle V1B_TB, V2B_TB included in the detection values.

$$\theta 2 \approx \tan^{-1}\{(2\times V1B\_TB)/(2\times V2B\_TB)\} = \tan^{-1}(V1B\_TB/V2B\_TB) \quad (13)$$

It is only required that the setting values of the first cycle TA, the second cycle TB, the first system detection timing, the second system detection timing, the first system removal processing interval ΔT1, and the second system removal processing interval ΔT2 are preliminarily set to become the predetermined relation between the first system and the second system; the processing of the first system and the processing of the second system can be performed independently with each other; and it is not necessary to perform synchronous control in real time between the first system and the second system.

2. Embodiment 2

Next, the angle detection apparatus according to Embodiment 2 will be explained. The explanation for constituent parts the same as those in Embodiment 1 will be omitted. The basic configuration of the angle detection apparatus according to the present embodiment is the same as that of Embodiment 1. But, the configuration of each second system processing units 51B to 54B of the controller 50 is different from that of Embodiment 1.

Also in the present embodiment, the second system output signal detection unit 52B detects periodically the output signals V1B, V2B of the second system two output windings 111B, 112B at preliminarily set detection timing (the second system detection timing).

<Problem Due to Magnetic Interference Between Systems>

Figure 9:
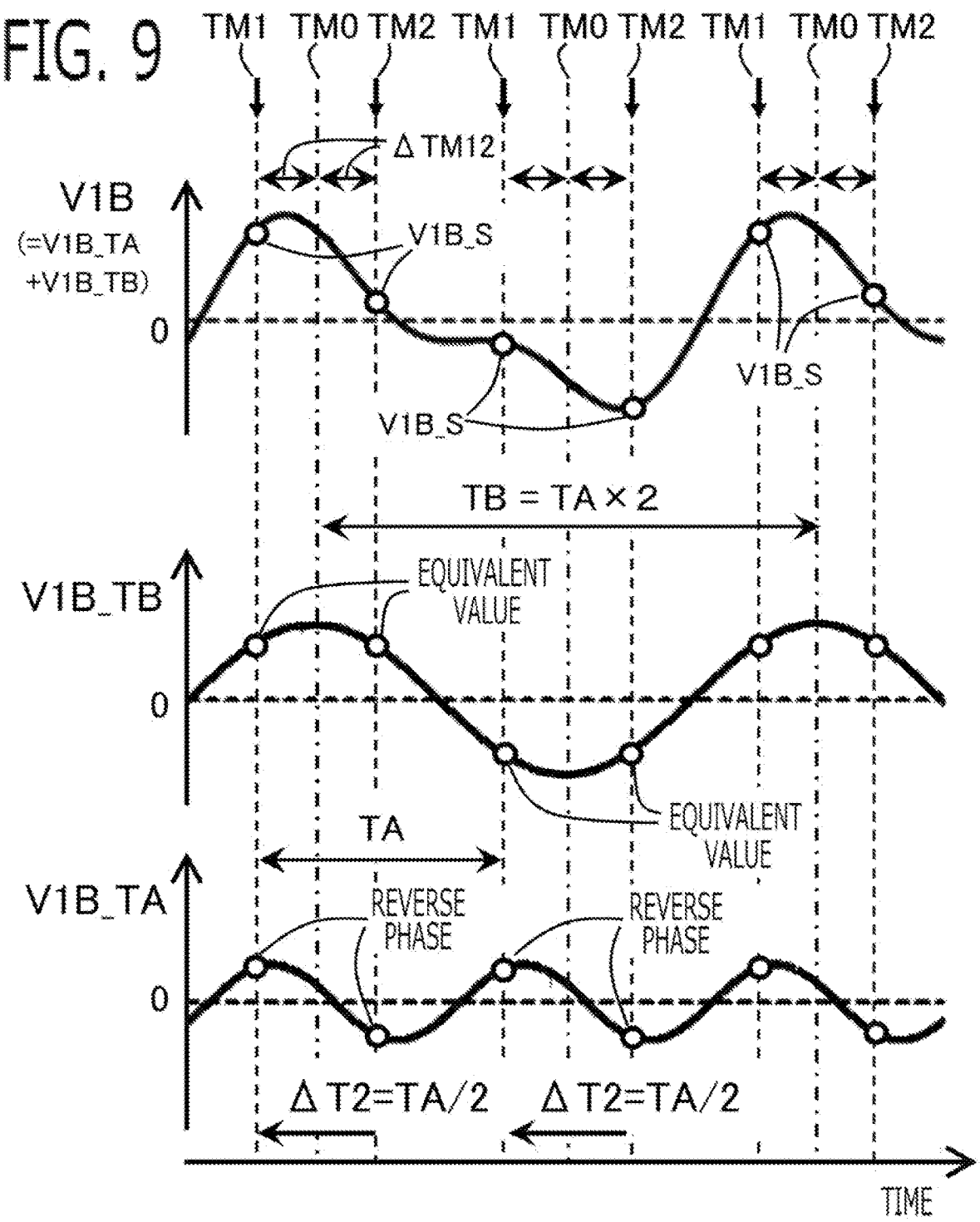
FIG. 9 is a time chart for explaining the first cycle component removal processing of the second system according to Embodiment 2.

As showing an example of the output signal V1B of the second system first output winding in FIG. 9, the components of the first cycle induced by the magnetic flux of the first cycle TA excited in the first system excitation winding 10A are superimposed on each of the output signals V1B, V2B of the second system two output windings 111B, 112B, due to the magnetic interference between systems. The output signal V1B of the second system first output winding is shown in the upper row graph of FIG. 9; the component of the second cycle V1B_TB induced by the magnetic flux of the second system excitation winding 10B included in the output signal V1B of the second system first output winding is shown in the middle graph; and the component of the first cycle V1B_TA induced by the magnetic flux of the first system excitation winding 10A included in the output signal V1B of the second system first output winding is shown in the lower row graph. The output signal V1B of the second system first output winding becomes a signal obtained by totaling the component of the second cycle V1B_TB and the component of the first cycle V1B_TA, and if the angle is calculated with these signals, the detection error will occur. Therefore, in order to suppress the detection error of the angle, it is necessary to remove the component of the first cycle V1B_TA from the output signal V1B of the second system first output winding.

<First Cycle Component Removal Processing>

Also in the present embodiment, the second system removal processing unit 53B performs the first cycle component removal processing which removes the component of the first cycle, to the detection values V1B_S, V2B_S of the output signals of the second system two output windings. Then, the second system angle calculation unit 54B calculates the second angle θ2 based on the detection values V1B_F, V2B_F of the output signals of the second system two output windings after the first cycle component removal processing.

In the present embodiment, unlike Embodiment 1, based on the principle explained in the following, the first cycle component removal processing is performed. As shown in the lower row graph of FIG. 9, in the component of the first cycle V1B_TA of the output signal of the second system first output winding, the phase is reversed and the sign of plus or minus is reversed in a cycle (for example, half cycle TA/2 of the first cycle) obtained by adding an integral multiple of the first cycle TA to a half cycle TA/2 of the first cycle.

Then, as the first cycle component removal processing, the second system removal processing unit 53B adds the detection values V1B_S, V2B_S of the output signals of the second system two output windings detected at this time detection timing, and the detection values V1B_Sold, V2B_Sold of the output signals of the second system two output windings detected at the detection timing earlier by the second system removal processing interval ΔT2 than this time detection timing. The second system removal processing interval ΔT2 is set to an interval obtained by adding the integral multiple of the first cycle TA to the half cycle TA/2 of the first cycle, as shown in a next equation. Herein, X is an integer greater than or equal to 0. In the present embodiment, X is set to 0, and the second system removal processing interval ΔT2 is set to the half cycle TA/2 of the first cycle.

$$\Delta T2 = TA/2 + TA \times X \quad (14)$$

Then, the second system angle calculation unit 54B calculates the second angle θ2 based on the detection values V1B_F, V2B_F of the output signals of the second system two output windings after addition.

According to this configuration, the two components of the first cycle whose the signs of plus or minus are reversed with each other are added, and the two components of the first cycle are canceled with each other. Accordingly, in the detection values V1B_F, V2B_F of the output signals of the second system two output windings after addition, the components of the first cycle are removed. Then, based on the detection values after removing the components of the first cycle, the second angle θ2 can be calculated with good accuracy.

In the present embodiment, as shown in FIG. 9, the second system output signal detection unit 52B detects periodically the output signals V1B, V2B of the second system two output windings at two timings TM1, TM2 which become before-and-after symmetrical with respect to a reference timing TM0 when the AC voltage VRB of the second cycle TB applied to the second system excitation winding 10B becomes the maximum value or the minimum value.

An interval between two timings which become before-and-after symmetry is set to the second system removal processing interval ΔT2. Therefore, as shown in a next equation, an interval ΔTM12 between each of before-and-after two timings TM1, TM2 and the reference timing TM0 is set to the half of the second system removal processing interval ΔT2.

$$\Delta TM12 = \Delta T2/2 \quad (15)$$

Then, the second system removal processing unit 53B adds the detection values of the output signals of the second system two output windings detected at the two timings TM1, TM2 which become before-and-after symmetry, with each other; and calculates the second angle θ2 based on the detection values V1B_F, V2B_F of the output signals of the second system two output windings after addition.

According to this configuration, as shown in FIG. 9, the components of the second cycle included in the detection values of the output signals of the second system two output windings detected at two timings have the same phase, and become the equivalent values with the same sign of plus or minus. Since the interval between two timings TM1, TM2 is set to the second system removal processing interval ΔT2, in the components of the first cycle included in the detection values of the output signals of the second system two output windings detected at two timings TM1, TM2, the phases are reversed and the signs of plus or minus are reversed. Therefore, the detection values V1B_F, V2B_F of the output signals of the second system two output windings after addition correspond to the double values of the components of the second cycle V1B_TB, V2B_TB included in the detection values, respectively.

$$V1B\_F \approx 2 \times V1B\_TB$$

$$V2B\_F \approx 2 \times V2B\_TB \quad (16)$$

Accordingly, in the equation (18) and the equation (19) described below, since 2 is canceled by calculating a ratio between the detection value V1B_F of the output signal of the second system first output winding after the addition processing and the detection value V2B_F of the output signal of the second system second output winding after the addition processing, the second angle θ2 can be calculated with good accuracy.

Figure 10:
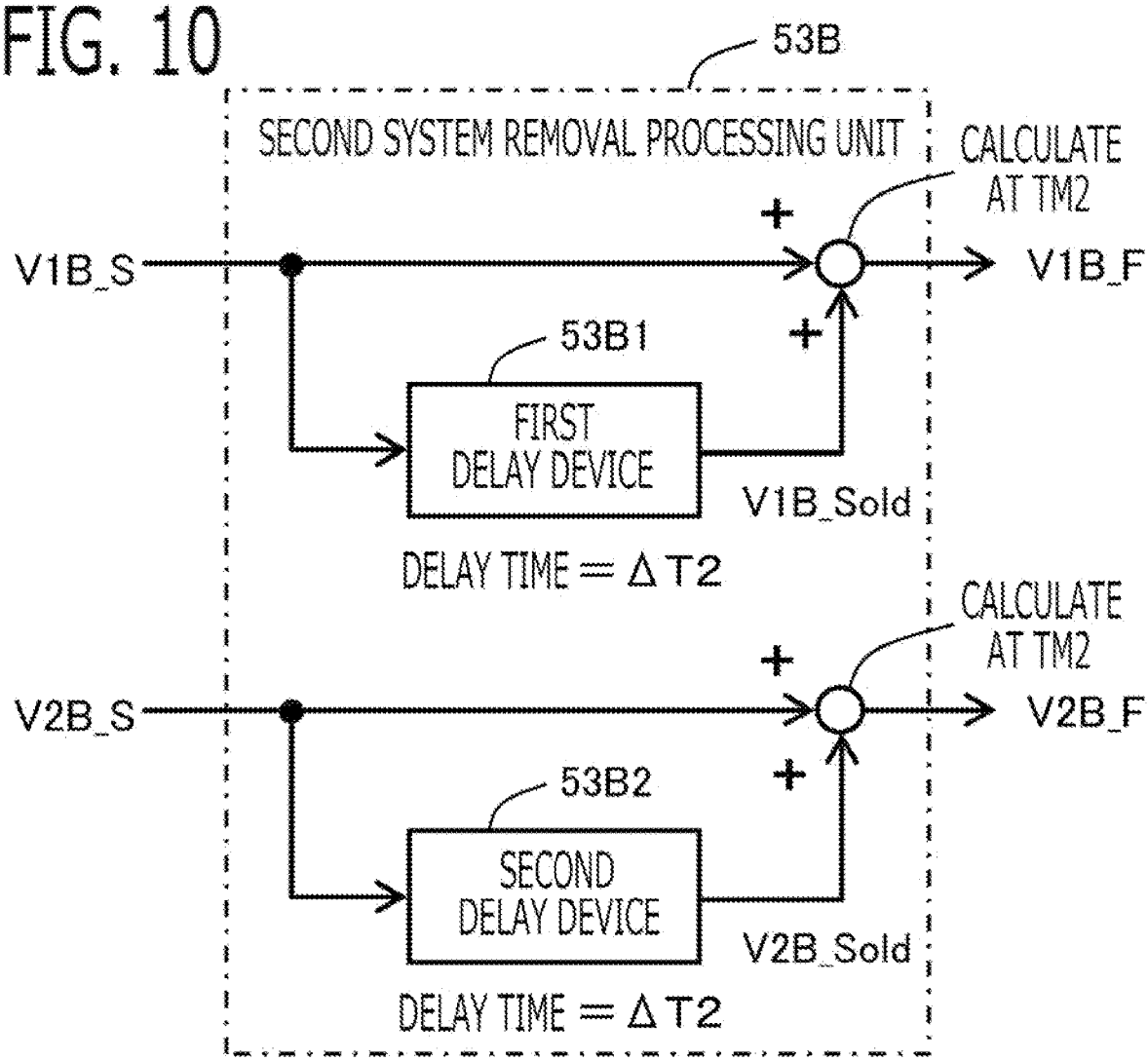
FIG. 10 is a block diagram of the second system removal processing unit according to Embodiment 2.

The second system removal processing unit 53B is constituted, for example, as shown in FIG. 10. The second system removal processing unit 53B is provided with a first delay device 53B1 which delays the detection value V1B_S of the output signal of the second system first output winding by the second system removal processing interval ΔT2, and outputs; adds the detection value V1B_S of the output signal of the second system first output winding and the output V1B_Sold of the first delay device 53B1, at the timing TM2 after the reference timing TM0; and calculates the detection value V1B_F of the output signal of the second system first output winding after the first cycle component removal processing. Similarly, the second system removal processing unit 53B is provided with a second delay device 53B2 which delays the detection value V2B_S of the output signal of the second system second output winding by the second system removal processing interval ΔT2, and outputs; adds the detection value V2B_S of the output signal of the second system second output winding and the output V2B_Sold of the second delay device 53B2, at the timing TM2 after the reference timing TM0; and calculates the detection value V2B_F of the output signal of the second system second output winding after the first cycle component removal processing.

In the present embodiment, as shown in a next equation, the second cycle TB is set to twice of the first cycle TA. The second system removal processing interval ΔT2 is set to the half cycle TA/2 of the first cycle. Therefore, the interval ΔTM12 between each of before-and-after two timings TM1, TM2 and the reference timing TM0 is set to ¼ of the first cycle TA/4.

$$TB = TA \times 2$$

$$\Delta T2 = TA/2$$

$$\Delta TM12 = TA/4 \quad (17)$$

The second system output signal detection unit 52B detects the output signals V1B, V2B of the second system two output windings at every ¼ of the second cycle TB/4; and each detection timing is set so as to become before-and-after symmetrical with respect to the reference timing TM0 when the AC voltage VRB of the second cycle TB becomes the maximum value or the minimum value.

<Calculation of the Second Angle θ2>

Similar to Embodiment 1, as shown in a next equation, the second system angle calculation unit 54B calculates the second angle θ2 by calculating an arc tangent (an arc tangent function) of a ratio between the detection value V1B_F of the output signal of the second system first output winding and the detection value V2B_F of the output signal of the second system second output winding after the first cycle component removal processing.

$$\theta2 = \tan^{-1}(V1B\_F/V2B\_F) \quad (18)$$

As shown in the equation (16), the detection values V1B_F, V2B_F of the output signals of the second system two output windings after the first cycle component removal processing correspond to the double values of the components of the second cycle V1B_TB, V2B_TB included in the detection values, respectively. Therefore, as shown in a next equation in which the equation (16) is substituted in the equation (18), the second angle θ2 is calculated with good accuracy by the ratio of the components of the second cycle V1B_TB, V2B_TB included in the detection values.

$$\theta2 \approx \tan^{-1}\{(2 \times V1B\_TB)/(2 \times V2B\_TB)\} = \tan^{-1}(V1B\_TB/V2B\_TB) \quad (19)$$

3. Embodiment 3

Figure 11:
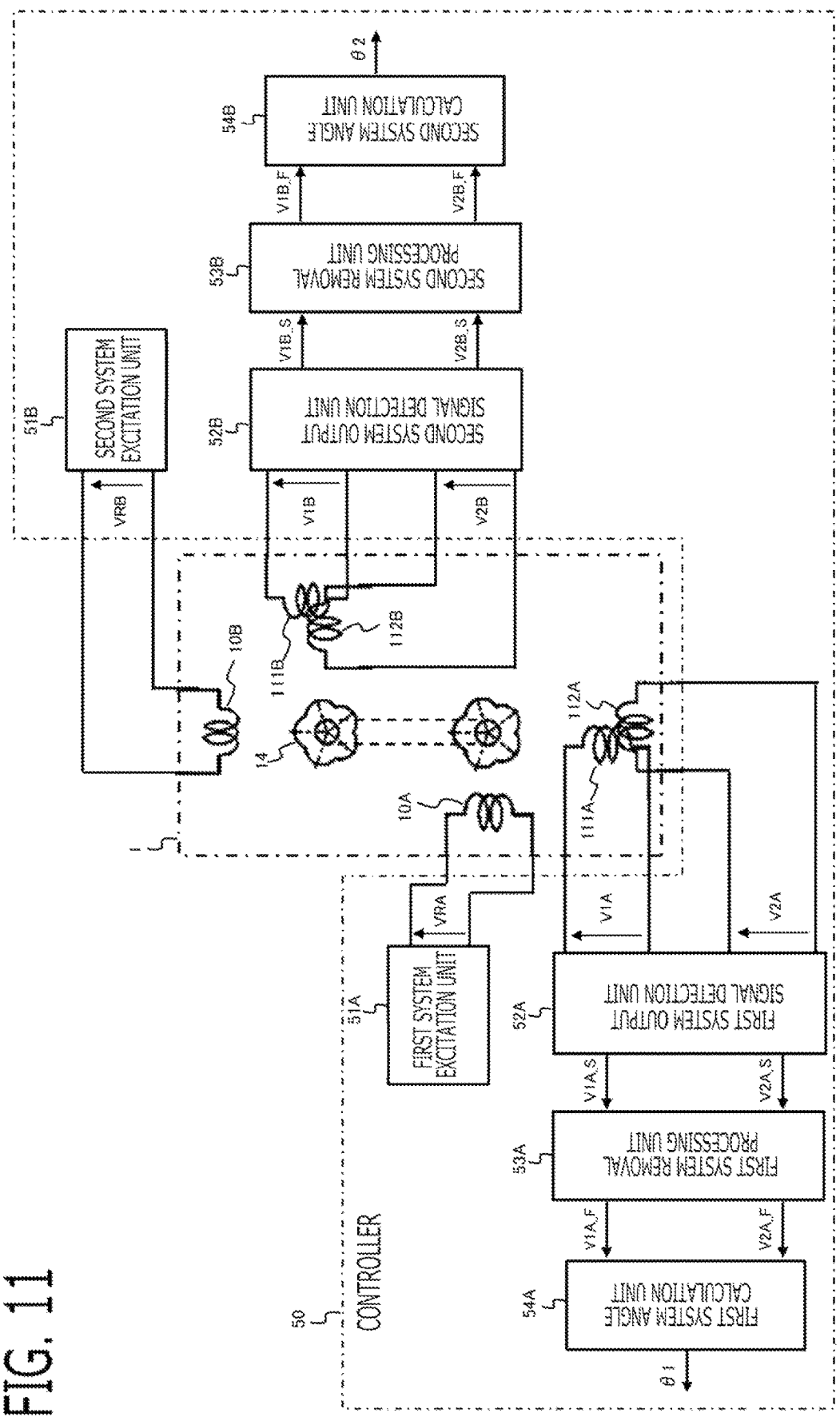
FIG. 11 is a schematic configuration diagram of the angle detection apparatus according to Embodiment 3.

Next, the angle detection apparatus according to Embodiment 3 will be explained. The explanation for constituent parts the same as those in each of Embodiments 1 or 2 will be omitted. The basic configuration of the angle detection apparatus according to the present embodiment is the same as that of Embodiment 1. But, the configuration of the resolver 1 is different from Embodiment 1 or 2. FIG. 11 is a schematic configuration diagram of the angle detection apparatus according to the present embodiment.

Similar to Embodiment 1, the resolver 1 is provided with the first system excitation winding 10A, the first system two output windings 111A, 112A, the second system excitation winding 10B, and the second system two output windings 111B, 112B. A magnetic interference occurs between the first system windings and the second system windings.

However, in the present embodiment, unlike Embodiment 1, as the schematic diagram of the resolver 1 is shown in FIG. 12, the first system excitation winding 10A and the first system two output windings 111A, 112A are wound around the first system stator 13A; and the second system excitation winding 10B and the second system two output windings 111B, 112B are wound around the second system stator 13B. The first system stator 13A and the second system stator 13B are arranged adjacent to each other in the axial direction; and a magnetic interference occurs between the first system windings and the second system windings. In FIG. 12, the teeth and the windings of the first system stator 13A, and the teeth and the windings of the second system stator 13B are omitted in figure.

The first system stator 13A and the second system stator 13B are coaxially arranged adjacent to each other in the axial direction; and the rotor 14 formed integrally is arranged in the radial-direction inner side of the first system stator 13A and the second system stator 13B. The rotor 14 is provided with a plurality of projection parts which are arranged equally in the circumferential direction on the peripheral part of the rotor. In the present embodiment, the rotor part located in the radial-direction inner side of the first system stator 13A and the rotor part located in the radial-direction inner side of the second system stator 13B have the same shape of the projection parts. The rotor part of the radial-direction inner side of the first system stator 13A and the rotor part of the radial-direction inner side of the second system stator 13B may have the different shapes and the different numbers of the projection parts with each other; and these may be the different bodies connected so as to rotate integrally.

The first system stator 13A is provided with a plurality of teeth arranged equally in the circumferential direction. The first system first output winding 111A and the first system second output winding 112A are distributed and wound around each teeth of the first system stator 13A so that the amplitudes of those induced AC voltages are mutually different 90 degrees in the electrical angle. The first system excitation winding 10A is distributed and wound around each teeth of the first system stator 13A. The second system stator 13B is provided with a plurality of teeth arranged equally in the circumferential direction. The second system first output winding 111B and the second system second output winding 112B are distributed and wound around each teeth of the second system stator 13B so that the amplitudes of those induced AC voltages are mutually different 90 degrees in the electrical angle. The second system excitation winding 10B is distributed and wound around each teeth of the second system stator 13B. The teeth number of the first system stator 13A and the teeth number of the second system stator 13B may be the same numbers, or may be the different numbers.

Even using the configuration of this kind resolver 1, by performing the similar processing as the controller 50 of Embodiment 1 or 2, even if the magnetic interference between systems occurs, the first angle θ1 and the second angle θ2 are detected with good accuracy.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the first system removal processing unit 53A performs the addition processing of this time detection value and the detection value before the first system removal processing interval ΔT1, as the second cycle component removal processing which removes the component of the second cycle included in the detection values of the output signals of the first system two output windings; and the second system removal processing unit 53B performs the subtraction processing or the addition processing of this time detection value and the detection value before the second system removal processing interval ΔT2, as the first cycle component removal processing which removes the component of the first cycle included in the detection values of the output signals of second system two output windings. However, embodiments of the present disclosure are not limited to the foregoing case. That is to say, the first system removal processing unit 53A may perform a band elimination filter processing such as a high pass filter processing or a band stop filter processing which removes the component of the second cycle, as the second cycle component removal processing. The second system removal processing unit 53B may perform a band elimination filter processing such as a low pass filter processing or a band stop filter processing which removes the component of the first cycle, as the first cycle component removal processing.

(2) In each of the above-mentioned Embodiments, there been explained the case where the one controller 50 is provided with the processing units 51A to 54A of the first system, and the processing units 51B to 54B of the second system. However, embodiments of the present disclosure are not limited to the foregoing case. That is to say, a controller of the first system may be provided with the processing units 51A to 54A of the first system, and a controller of the second system may be provided with the processing units 51B to 54B of the second system, or a plurality of controllers may be distributedly provided with each processing units 51A to 54B of the first system and the second system.

(3) In each of the above-mentioned Embodiments, there has been explained the case where the first system output signal detection unit 52A detects the output signals V1A, V2A of the first system two output windings at every the first cycle TA when the excitation AC voltage VRA becomes the maximum value. However, embodiments of the present disclosure are not limited to the foregoing case. That is to say, the first system output signal detection unit 52A may detect the output signals V1A, V2A of the first system two output windings at every the first cycle TA when the excitation AC voltage VRA becomes the minimum value, or may detect at every the first cycle TA when the AC voltage VRA becomes other than the maximum value and the minimum value, as mentioned above. Alternatively, the first system output signal detection unit 52A may detect at every half cycle TA/2 of the first cycle when the excitation AC voltage VRA becomes the maximum value or the minimum value. Alternatively, the first system output signal detection unit 52A may detect the output signals V1A, V2A of first system two output windings at every cycle which is different from the half cycle TA/2 of the first cycle and the first cycle TA (for example, a cycle obtained by dividing the first system removal processing interval ΔT1 by an integer greater than or equal to one). Also in these cases, the first delay device 53A1 and the second delay device 53A2 of the first system removal processing unit 53A delays the input signal by the first system removal processing interval ΔT1, and outputs.

(4) In the above-mentioned Embodiment 1, there has been explained the case where the second system output signal detection unit 52B detects the output signals V1B, V2B of the second system two output windings at every the half cycle TB/2 of the second cycle when the excitation AC voltage VRB becomes the maximum value or the minimum value. However, embodiments of the present disclosure are not limited to the foregoing case. That is to say, as mentioned above, the second system output signal detection unit 52B may detect at every the half cycle TB/2 of the second cycle when the excitation AC voltage VRB becomes other than the maximum value and the minimum value. Alternatively, the second system output signal detection unit 52B may detect the output signals V1B, V2B of second system two output windings at every cycle which is different from the half cycle TB/2 of the second cycle (for example, a cycle obtained by dividing the second system removal processing interval ΔT2 by an integer greater than or equal to one). Also in these cases, the first delay device 53B1 and the second delay device 53B2 of the second system removal processing unit 53B delays the input signal by the second system removal processing interval ΔT2, and outputs.

(5) In the above-mentioned Embodiment 2, there has been explained the case where the second system output signal detection unit 52B detects the output signals V1B, V2B of the second system two output windings at every ¼ of the second cycle TB/4; and each detection timing is set so as to become before-and-after symmetrical with respect to the reference timing TM0 when the AC voltage VRB of the second cycle TB becomes the maximum value or the minimum value. However, embodiments of the present disclosure are not limited to the foregoing case. That is to say, the second system output signal detection unit 52B may detect periodically the output signals V1B, V2B of the second system two output windings at two timings which become before-and-after symmetrical with respect to the reference timing TM0 when the excitation AC voltage VRB becomes the maximum value. Alternatively, the second system output signal detection unit 52B may detect periodically the output signals V1B, V2B of the second system two output windings at two timings which become before-and-after symmetrical with respect to the reference timing TM0 when the excitation AC voltage VRB becomes the minimum value. As long as the interval between two timings which become before-and-after symmetry is set to the second system removal processing interval ΔT2, it may be set to an interval other than ¼ of the second cycle TB/4. Also in these cases, the first delay device 53B1 and the second delay device 53B2 of the second system removal processing unit 53B delays the input signal by the second system removal processing interval ΔT2, and outputs. And, the second system removal processing unit 53B performs an addition processing at the timing TM2 after the reference timing TM0, and calculates the detection values V1B_F, V2B_F of the output signals of the second system two output windings after addition.

(6) In each of the above-mentioned Embodiments, there has been explained the case where the first system excitation unit 51A generates the PWM signal which turns on and off the switching device based on the comparison result between the AC voltage command and the triangular wave. However, embodiments of the present disclosure are not limited to the foregoing case. That is to say, the first system excitation unit 51A may generate a rectangular wave signal of the first cycle TA which outputs binary voltage of the High level (for example, 5V) and Low level (for example, 0V) alternately by the driving circuit, its output may be inputted into a lowpass filter circuit, and the output of the lowpass filter circuit may be applied as the AC voltage VRA.

(7) In each of the above-mentioned Embodiments, there has been explained the case where the second system excitation unit 51B generates the PWM signal which turns on and off the switching device based on the comparison result between the AC voltage command and the triangular wave. However, embodiments of the present disclosure are not limited to the foregoing case. That is to say, the second system excitation unit 51B may generate a rectangular wave signal of the second cycle TB which outputs binary voltage of the High level (for example, 5V) and Low level (for example, 0V) alternately by the driving circuit, its output may be inputted into a lowpass filter circuit, and the output of the lowpass filter circuit may be applied as the AC voltage VRB.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Resolver, 10A First system excitation winding, 10B Second system excitation winding, 111A First system first output winding, 112A First system second output winding, 111B Second system first output winding, 112B Second system second output winding, 50 Controller, 51A First system excitation unit, 52A First system output signal detection unit, 53A First system removal processing unit, 54A First system angle calculation unit, 51B Second system excitation unit, 52B Second system output signal detection unit, 53B Second system removal processing unit, 54B Second system angle calculation unit, θ1 First angle, θ2 Second angle, TA First cycle, TB Second cycle, ΔT1 First system removal processing interval, ΔT2 Second system removal processing interval, TM0 Reference timing, V1A_S Detection value of the output signal of the first system first output winding, V2A_S Detection value of the output signal of the first system second output winding, V1A_Sold Detection value of the output signal of the first system first output winding before the first system removal processing interval, V2A_Sold Detection value of the output signal of the first system second output winding before the first system removal processing interval, V1A_F Detection value of the output signal of the first system first output winding after the second cycle component removal processing, V2A_F Detection value of the output signal of the first system second output winding after the second cycle component removal processing, V1A_TA Component of the first cycle included in the output signal of the first system first output winding, V1A_TB Component of the second cycle included in the output signal of the first system first output winding, V2A_TA Component of the first cycle included in the output signal of the first system second output winding, V1B_S Detection value of the output signal of the second system first output winding, V2B_S Detection value of the output signal of the second system second output winding, V1B_Sold Detection value of the output signal of the second system first output winding before the second system removal processing interval, V2B_Sold Detection value of the output signal of the second system second output winding before the second system removal processing interval, V1B_F Detection value of the output signal of the second system first output winding after the first cycle component removal processing, V2B_F Detection value of the output signal of the second system second output winding after the first cycle component removal processing, V1B_TA Component of the first cycle included in the output signal of the second system first output winding, V1B_TB Component of the second cycle included in the output signal of the second system first output winding, V2B_TA Component of the first cycle included in the output signal of the second system second output winding

What is claimed is:

1. An angle detection apparatus comprising:
a resolver comprising a first system excitation winding, two first system output windings, a second system excitation winding, and two second system output windings, in which magnetic interference occurs between a first system and a second system;
a first system exciter that applies AC voltage of a first cycle to the first system excitation winding;
a second system exciter that applies AC voltage of a second cycle longer than the first cycle, to the second system excitation winding;
a first system output signal detector that detects periodically output signals of the two first system output windings at a predetermined detection timing;
a first system removal processor that performs a second cycle component removal processing by removing a frequency component of the second cycle time from detection values of the output signals of the two first system output windings; and a first system angle calculator that calculates a first angle of the resolver, based on the detection values of the output signals of the two first system output windings after the second cycle component removal processing, wherein the first system removal processor, as the second cycle component removal processing, adds the detection values of the output signals of the two first system output windings detected at the present detection timing, and the detection values of the output signals of the two first system output windings detected at the detection timing earlier the present detection timing by a first system removal processing time interval, wherein when setting the second cycle to TB, the first system removal processing time interval is set to TB/2+ TB×M (M is an integer greater than or equal to 0), and wherein the first system angle calculator calculates the first angle based on the detection values of the output signals of the first system output windings after addition.

2. The angle detection apparatus according to claim 1, wherein when setting the first cycle to TA, the second cycle is set to TA×2×N (N is an integer greater than or equal to 1).

3. The angle detection apparatus according to claim 1, wherein the first system output signal detector detects the output signals of the two first system output windings at a timing when the AC voltage of the first cycle applied to the first system excitation winding becomes the maximum value or the minimum value.

4. The angle detection apparatus according to claim 1, wherein the first system excitation winding, the two first system output windings, the second system excitation winding, and the two second system output windings are wound around a stator.

5. The angle detection apparatus according to claim 1, wherein the first system excitation winding and the two first system output windings are wound around a first system stator; and wherein the second system excitation winding and the two second system output windings are wound around a second system stator which adjoins the first system stator in an axial direction.

6. An angle detection apparatus comprising:

a resolver comprising a first system excitation winding, two first system output windings, a second system excitation winding, and two second system output windings, in which magnetic interference occurs between a first system and a second system;

a first system exciter that applies AC voltage of a first cycle to the first system excitation winding;

a second system exciter that applies AC voltage of a second cycle longer than the first cycle, to the second system excitation winding;

a first system output signal detector that detects periodically output signals of the two first system output windings at a predetermined detection timing;

a first system removal processor that performs a second cycle component removal processing by removing a frequency component of the second cycle time from detection values of the output signals of the two first system output windings;

a first system angle calculator that calculates a first angle of the resolver, based on the detection values of the output signals of the two first system output windings after the second cycle component removal processing;

a second system output signal detector that detects periodically output signals of the two second system output windings at a predetermined detection timing;

a second system removal processor that performs a first cycle component removal processing by removing a frequency component of the first cycle time from detection values of the output signals of the two second system output windings; and a second system angle calculator that calculates a second angle of the resolver, based on the detection values of the output signals of the two second system output windings after the first cycle component removal processing, wherein a second system removal processor, as the first cycle component removal processing, performs a subtraction processing by calculating differences between the detection values of the output signals of the two second system output windings detected at the present detection timing, and the detection values of the output signals of the two second system output windings detected at the detection timing earlier the present detection timing by a second system removal processing time interval;

wherein when setting the first cycle to TA, the second system removal processing time interval is set to TA×P (P is an integer greater than or equal to 1); and wherein the second system angle calculator calculates the second angle based on the detection values of the output signals of the two second system output windings after the subtraction processing.

7. The angle detection apparatus according to claim 6, wherein when setting the first cycle to TA, the second cycle is set to TA×2×N (N is an integer greater than or equal to 1); and wherein when setting the second cycle to TB, the second system removal processing time interval is set to TB/2+ TB×L (L is an integer greater than or equal to 0).

8. The angle detection apparatus according to claim 6, wherein the second system output signal detector detects the output signals of the two second system output windings at a timing when the AC voltage of the second cycle applied to the second system excitation winding becomes the maximum value or the minimum value.

9. An angle detection apparatus comprising:

a resolver comprising a first system excitation winding, two first system output windings, a second system excitation winding, and two second system output windings, in which magnetic interference occurs between a first system and a second system;

a first system exciter that applies AC voltage of a first cycle to the first system excitation winding;

a second system exciter that applies AC voltage of a second cycle longer than the first cycle, to the second system excitation winding;

a first system output signal detector that detects periodically output signals of the two first system output windings at a predetermined detection timing;

a first system removal processor that performs a second cycle component removal processing by removing a frequency component of the second cycle time from detection values of the output signals of the two first system output windings;

a first system angle calculator that calculates a first angle of the resolver, based on the detection values of the output signals of the two first system output windings after the second cycle component removal processing;

a second system output signal detector that detects periodically output signals of the two second system output windings at a predetermined detection timing;

a second system removal processor that performs a first cycle component removal processing by removing a frequency component of the first cycle time from detection values of the output signals of the two second system output windings; and a second system angle calculator that calculates a second angle of the resolver, based on the detection values of the output signals of the two second system output windings after the first cycle component removal processing, wherein the second system removal processor, as the first cycle component removal processing, adds the detection values of the output signals of the two second system output windings detected at the present detection timing, and the detection values of the output signals of the two second system output windings at the detection timing earlier than the present detection timing by a second system removal processing time interval;

wherein the second system angle calculator calculates the second angle based on the detection values of the output signals of the two second system output windings after addition; and wherein when setting the first cycle to TA, the second system removal processing time interval is set to TA/2+ TA×X (X is an integer greater than or equal to 0).

10. The angle detection apparatus according to claim 9, wherein the second system output signal detector detects periodically the output signals of the two second system output windings at two timings symmetrically before-and-after a reference timing when the AC voltage of the second cycle applied to the second system excitation winding becomes the maximum value or the minimum value;

wherein an interval between the two timings is set as the second system removal processing time interval;

wherein the second system removal processor adds the detection values of the output signals of the two second system output windings detected at each of the two timings with each other; and wherein the second system angle calculator calculates the second angle based on the detection values of the output signals of the two second system output windings after addition.

* * * * *